Figure 1:
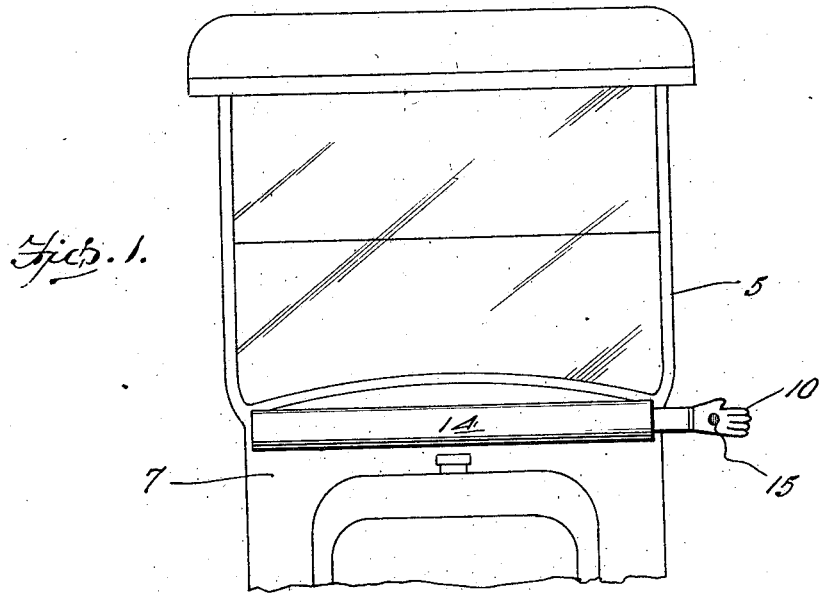

Oct. 7, 1924.  
E. HOLWAGER  
1,510,781  
DIRECTION INDICATOR FOR MOTOR VEHICLES  
Filed Feb. 13, 1924  
2 Sheets-Sheet 1

Inventor  
E. Holwager  
By Clarence A. O'Brien  
Attorney

Inventor
E. Holwager

Patented Oct. 7, 1924.

1,510,781

UNITED STATES PATENT OFFICE.

EMMA HOLWAGER, OF MADISON, INDIANA.

DIRECTION INDICATOR FOR MOTOR VEHICLES.

Application filed February 13, 1924. Serial No. 692,563.

*To all whom it may concern:*

Be it known that EMMA HOLWAGER, a citizen of the United States, residing at Madison, in the county of Jefferson and State of Indiana, has invented certain new and useful Improvements in Direction Indicators for Motor Vehicles, of which the following is a specification.

This invention relates generally to direction indicators for motor vehicles and has more specific reference to means disposed upon the cowl of the vehicle and operable from points within the vehicle adjacent the driver's seat whereby means may be extended outwardly from either the left or right of the vehicle to indicate the intentions of the driver thereof to turn his machine in these directions.

The primary object of the invention is to provide a direction indicator of this character that may be operated in an emergency, the different indicating elements thereof not relying upon any automatic mechanism that is liable to become out of order and be unknown to the operator which oftentimes results in unnecessary accidents.

An additional object is to provide an indicating mechanism for motor vehicles that may be readily associated with practically all types of vehicles and one that consists of few parts and these corelated in such a manner as to reduce the possibility of disarrangement to a minimum.

With the foregoing and other objects in view as the nature of the invention will be better understood, the same comprises the novel form, combination and arrangement of parts hereinafter more fully described, shown in the accompanying drawings and claimed.

In the drawings wherein like reference characters indicate corresponding parts throughout the several views:

Figure 1 is a fragmentary front elevational view of a motor vehicle equipped with an indicating mechanism constructed in accordance with the present invention.

Figure 4:
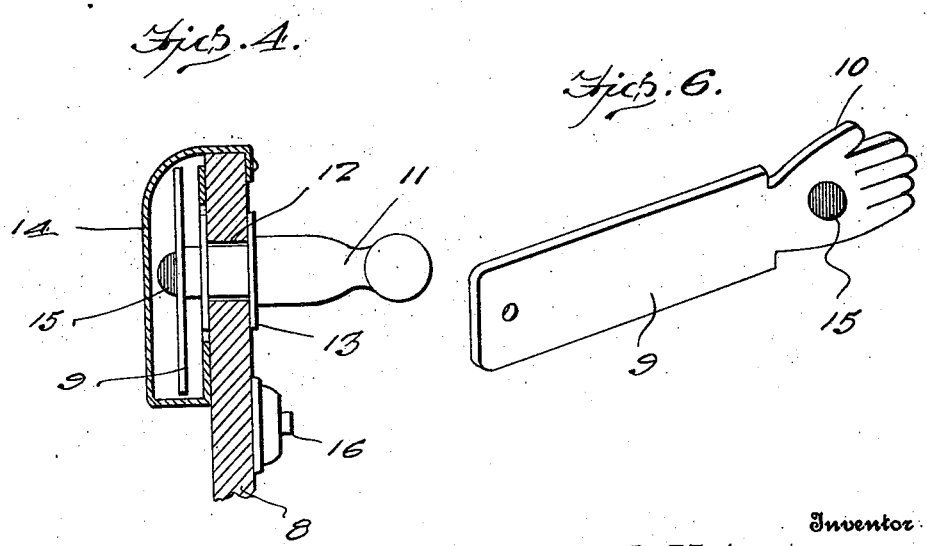
Figure 6:
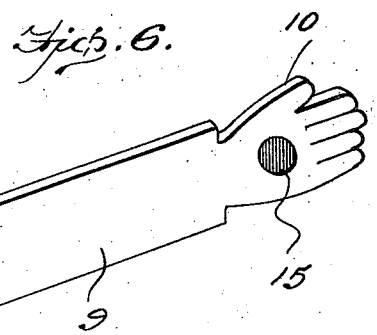
Figure 2:
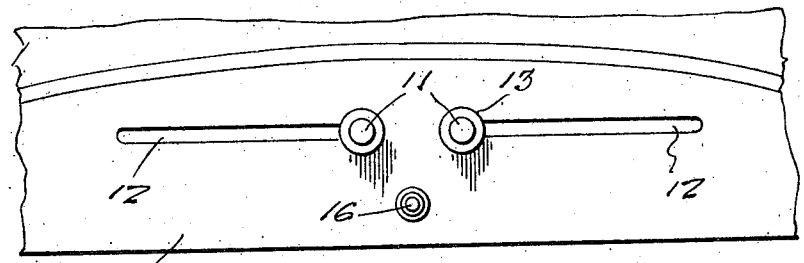
Figure 3:
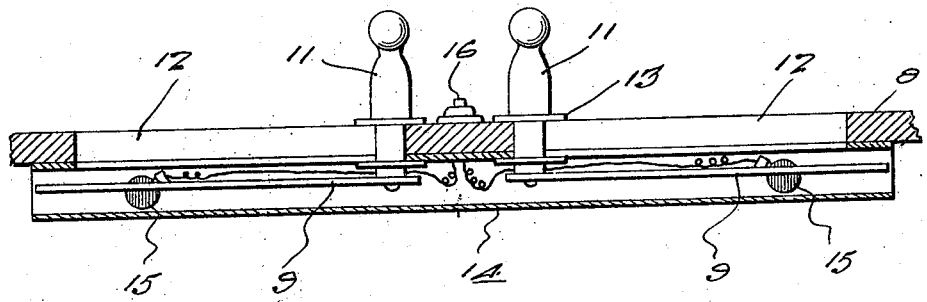
Figure 5:
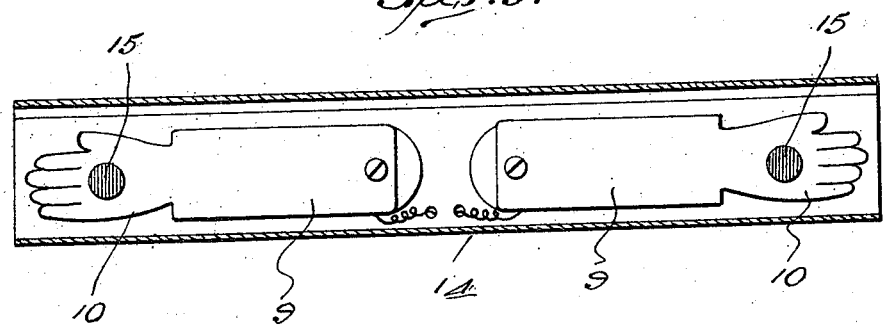

Figure 2 is a fragmentary elevational view of the instrument board of the vehicle for more adequately disclosing the means provided whereby the right and left hand signal members may be operated from within the vehicle, Figure 3 is a detail longitudinal sectional view taken through the vehicle and said indicating mechanism, Figure 4 is a detail vertical cross section thereof, Figure 5 is a detail longitudinal vertical sectional view through the indicating member protecting casing, and Figure 6 is a perspective view of one of the indicating members per se.

Now having particular reference to the drawings, 5 indicates generally a motor vehicle that includes a cowl 7 that is formed upon its inside as to provide an instrument board 8.

My novel direction indicating mechanism comprises a pair of relatively arm-shaped members 9—9, the ends of which are provided with extensions 10—10 in the form of human hands. These arm members 9—9 are rigidly secured at their inner ends to the front ends of operating handles 11—11 that are slidably disposed within longitudinal slots 12—12 in the before mentioned vehicle cowl. Upon opposite ends of the portions of these handles that are slidably disposed within the slots 12—12, are flanges 13 that prevent the disengagement of the handles from said slots.

From a consideration of Figures 3 and 4, it will be clearly noted that said indicating arms 9—9 are disposed upon the outer side of the vehicle and are protected by an open ended sheet metal casing 14 that is secured in any desirable manner to the cowl 7 of said vehicle.

The hand extensions 10—10 upon the outer ends of the arm members 9—9, are formed with openings within which are disposed electric bulbs 15—15, both of which are in normally open circuit with a suitable source of electric supply, preferably the storage battery of the vehicle, not shown, through the medium of preferably a push button switch 16 that is disposed upon said instrument board 8 of the vehicle.

From the foregoing, it will at once be apparent that when these indicating members 9—9 are disposed within the casing 14, they will be protected from the elements and the driver of the vehicle before attempting to make a right or left hand turn, moves either one of the handles 11—11 to an outward position for consequently moving the complementary one of the indicating arms 9—9 outwardly of said casing 14 after which the push button 16 is operated for illuminating the particular hand extension of that particular arm and thereby calling the attention of the drivers of approaching vehicles that intend to make a right or left hand turn as the case may be.

From the foregoing, it will at once be apparent that I have provided a highly novel, simple and inexpensive form of direction indicator for vehicles and one that will, I believe, meet all of the requirements for a successful commercial use.

Having thus described my invention, what I claim as new and desire to secure by Letters Patent is:

A direction indicator for automobiles comprising an open ended cylindrical casing, provided in one side at longitudinally spaced points with elongated guide slots, adapted to register with correspondingly disposed slots in an instrument board, a pair of indicators normally disposed within the casing and projectable through the open end thereof, right angularly disposed handles connected to the inner ends of said indicators, said handles extending through the slots in the casing and being adapted to extend through the slots in said board and being provided with shoulders at spaced points, for slidably contacting the board and casing.

In testimony whereof I affix my signature.

Mrs. EMMA HOLWAGER.